US006004079A

United States Patent [19]
Kislinger

[11] Patent Number: 6,004,079
[45] Date of Patent: Dec. 21, 1999

[54] CUTTER HEAD, IN PARTICULAR A PROFILE CUTTER HEAD

[75] Inventor: Heinrich Kislinger, Zell/Pram, Austria

[73] Assignee: Gebruder Leitz GmbH & Co. et al., Oberkochen, Germany

[21] Appl. No.: 08/392,766

[22] PCT Filed: Jul. 13, 1993

[86] PCT No.: PCT/EP93/01827

§ 371 Date: Jan. 30, 1995

§ 102(e) Date: Jan. 30, 1995

[87] PCT Pub. No.: WO94/03311

PCT Pub. Date: Feb. 17, 1994

[30] Foreign Application Priority Data

Aug. 3, 1992 [DE] Germany ............................. 92 10 363

[51] Int. Cl.$^{6}$ .............................. B27G 13/10; B23C 5/22

[52] U.S. Cl. ............................ 407/34; 144/230; 407/105; 407/111; 407/40

[58] Field of Search ................................. 407/41, 49, 50, 407/91, 93, 94, 95, 96, 105, 111, 108; 144/230

[56] References Cited

U.S. PATENT DOCUMENTS

| | | |
|---|---|---|
| 3,237,275 | 3/1966 | Middleton . |
| 3,907,016 | 9/1975 | Nicholson et al. . |
| 4,506,711 | 3/1985 | Armbruster et al. . |

FOREIGN PATENT DOCUMENTS

| | | |
|---|---|---|
| 0 345570 A1 | 12/1989 | European Pat. Off. . |
| 2443318 | 7/1980 | France . |
| 2537493 | 6/1984 | France . |
| 637215 | 10/1936 | Germany . |
| 1195934 | 7/1965 | Germany . |
| 2653222 | 6/1977 | Germany . |
| 3405614 A1 | 8/1985 | Germany . |

OTHER PUBLICATIONS

International Search Report dated Oct. 5, 1993.

*Primary Examiner*—Andrea L. Pitts
*Attorney, Agent, or Firm*—Blank Rome Comisky & McCauley LLP

[57] ABSTRACT

In a cutter head, especially for a profile cutter, with a basic body (1) having at least two recesses (3) uniformly distributed around its circumference, cutter (5) can interchangeably be secured in the recesses by means of a clamping device having at least one clamping component (8) and at least one clamping screw acting therewith and with the basic body (1). In the region of its inner end section, each of the clamping components is supported by the basic body (1) to pivot about an axis parallel to the latter's axis of rotation (12) and pivotable and clampable by means of at least one of the clamping screws (10) by a tensile force generated thereby against a bearing surface (4) of the recess (3).

16 Claims, 1 Drawing Sheet

CUTTER HEAD, IN PARTICULAR A PROFILE CUTTER HEAD

BACKGROUND OF THE INVENTION

The invention relates to a cutter head, in particular a profile cutter head, with a base body, which is provided with at least two fixtures, which are uniformly distributed over the base body's circumference and in which blades can be fixed interchangeably by means of one clamping device each, which exhibits at least one clamping element each and at least one clamping bolt, which interacts with said clamping element and the base body.

The known cutter heads of this kind are used to machine, for example to produce profiles, of solid wood and derived timber products. The drawback with these known tools is that they can be used usually only as a single and universal cutter head, but cannot be integrated into tool kits. Furthermore, the range in which the diameter and the cutting width can be selected, is frequently not adequately large. Another drawback is that the use of light metal for the base body presents a problem, since the clamping forces can result in nicks in the fixtures. If the clamping elements and the blades are fixed by a pin-hole connection, then profiles that overhang on one side can result in pin deformation, a feature that leads to a change in the position of the clamping elements and blades, thus resulting in surface errors and an increase in the residual unbalance. Furthermore, these known tools do not hold the preliminary dividing cut to a minimum, a process that is necessary for a cleaner surface during the machining of solid wood, since the clamping elements do not exhibit any profile contours below the cutting edge of the blades.

Therefore, the invention is based on the problem of providing an improved cutter head that avoids the problems of conventional devices.

SUMMARY OF THE INVENTION

The cutter head, according to the invention, can be used to machine and in particular to profile solid wood, derived timber products, plastics and nonferrous metals, and in particular as a single tool or in such a manner that it is integrated into tool kits. The tools can be designed with bore, with shaft and with defined profile.

Furthermore, the dimensional range of the cutter head according to the invention, thus the range of the selectable diameter and the selectable cutting width, is significantly greater than for known cutter heads and can be selected steplessly with constant accuracy of profile. The material for the blades and the cutting geometry can be optimally chosen for the corresponding field of application.

Even the use of light metal for the base body is no problem, since the material of the base body is subjected only to compressive stress due to the clamping elements. Therefore, a significant reduction in weight, good handling, less residual unbalance and thus also better care of the bearing is achieved.

It is especially advantageous if the swivel axis of the clamping elements relative to a bearing surface area, which transfers the clamping force to the blade and pushes said blade against a contact surface of the fixture, is moved in the direction of this contact surface. The pull of the clamping bolt can be converted quite well into the torque to be exerted on the clamping element.

In a preferred embodiment each clamping element exhibits as a bearing element a semi-cylindrical material segment, which projects beyond the bearing surface area and which extends in the axial direction of the base body and reaches into a groove of the fixture, whose cross section is semi-circular. Such a bearing is simple, produces a shape-locking connection between clamping element and base body in the axial direction and accurate positioning in this direction. Furthermore, the semi-circular groove excludes the risk of possible nicks.

Preferably the clamping bolts engage in the region between the bearing point of the clamping element and its bearing surface area intended to rest against the knife.

The base body is provided preferably with one bore each for each clamping bolt, said bore exhibiting a shoulder, which points away from the clamping element and against which the head of the clamping bolt is intended to rest and which is aligned with a tapped bore of the clamping element with which the clamping bolt is to engage. The clamping bolt can be a hexagon socket screw with normal or fine thread, which is tightened by hand by means of a hexagon socket screw key or a torque wrench.

Each of the clamping elements is profiled preferably according to the assigned blade and extends as far as the vicinity of its cutting edge. Thus, it acts as a chip breaker. But also the jacket of the bearing body is profiled advantageously according to the blades, during which process the blades project only a little beyond the base body. In this manner the requisite recoil safety is achieved. The profiled, largely closed, round shape of the body minimizes the emission of noise.

In a preferred embodiment a shape-locking connection in the radial direction is provided between each clamping element and the assigned blade, and in particular in such a manner that a material segment of the clamping element reaches into a groove, which extends in the axial direction over the entire axial reach of the blade and which also extends over the entire axial reach. Outstanding centrifugal force safety can be achieved through such a groove-spring connection, and in particular even at maximum cutting speeds.

A cylindrical pin is provided preferably to position the blade in the axial direction.

BRIEF DESCRIPTION OF THE DRAWINGS

In the following the invention is explained in detail with the aid of an embodiment shown in the drawings.

DETAILED DESCRIPTION OF THE PREFERRED EMBODIMENTS

Figure 1:
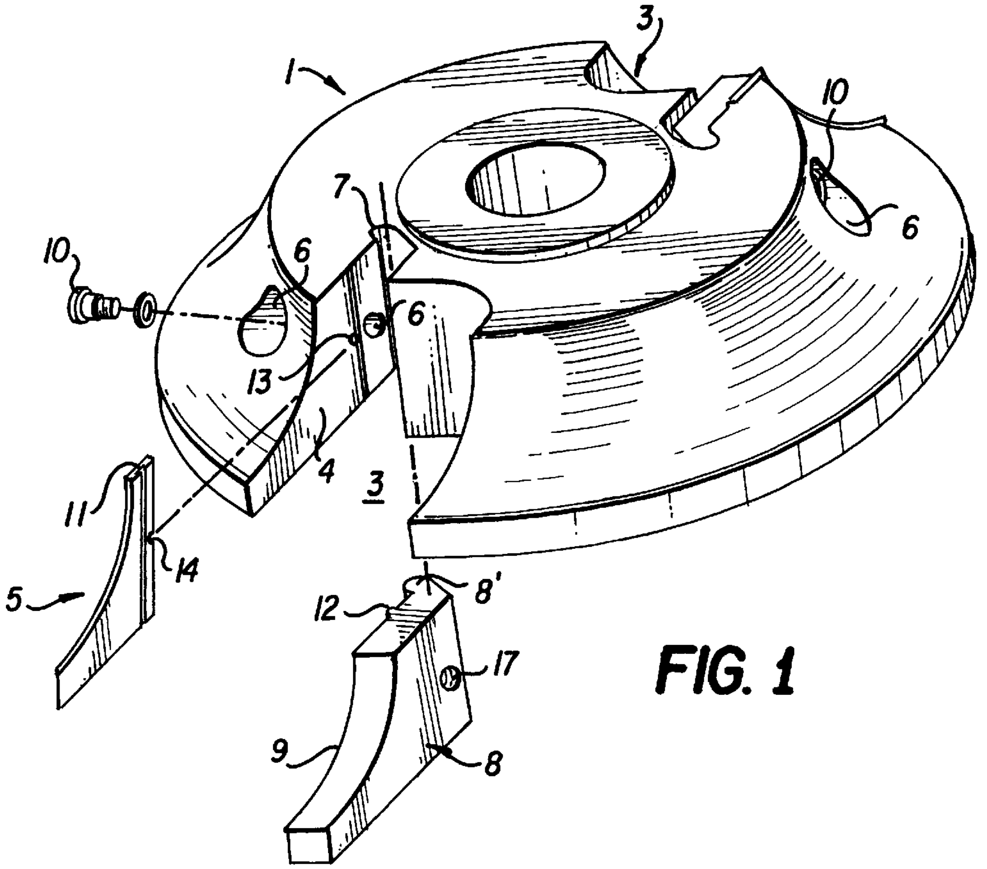
FIG. 1 is a perspective view of the embodiment, which is partially exploded.

A profile cutter head exhibits a base body, all of which is denoted as 1 and which is made of light metal in the embodiment, but could also be made of steel or plastic and is provided with a central bore 2, which penetrates axially said base body and is intended to receive a shaft. Furthermore, the base body 1 includes several identical fixtures 3, which are uniformly distributed over the circumference of the base body (in the embodiment two diametrically opposed) and which are open in the direction of the base body's outer jacket and extend from one to the other face. The flank of the groove-like fixture 3 that is shown on the right in FIG. 2 forms a flat contact surface 4, extending parallel to a radial plane of the base body 1, for a plateshaped blade 5. The reach of the contact surface 4 from the outer jacket of the base body 1 into said base body is greater than the corresponding reach of the blade 5, and in particular by an amount that is somewhat greater than the diameter of a bore 6, which starting from the outer jacket of the base body penetrates said base body perpendicularly to the contact surface 4 and opens into the latter radially within that region that attaches to the region against which the blade 5 rests.

A groove 7, whose cross section is semi-circular and which is open into the fixture 3 and extends over the entire axial length of the base body 1, is attached to the internal end of the flat contact surface 4, as shown in the Figures.

Groove 7 is intended to pivotally receive a flat clamping element 8 for the blade 5. The flat clamping element 8 includes along its edge, lying the closest to the central bore 2, a semi-cylindrical material segment 8', which extends over the entire axial reach of the clamping element 8. When assembled, semi-cylindrical segment 8' projects over the flat bearing surface area 9 of the clamping element 8 that faces the blade 5, by an amount that is greater than the thickness of the blade 5 and reaches into the groove 7, forming a pivotable mounting of the clamping element 8. The swivel axis extending parallel to the central bore 2 of the base body is moved, relative to the bearing surface area 9 beyond the contact surface 4. Furthermore, the semi-cylindrical material segment 8' and the groove 7 of the clamping element 8 position in the radial direction and form a shape-locking connection between clamping element 8 and base body 1, which can absorb any centrifugal forces.

In the region between the semicylindrical material segment 8' and the bearing surface area 9, which abuts the blade 5, the clamping element 8 is penetrated by a tapped bore, which aligns with the bore 6 and into which a clamping bolt 10 reaches that is introduced from the outside into the bore 6 and whose shoulder rests against a shoulder 6' of the base body pointing away from the clamping element 8. Thus, the clamping element 8 is pulled by the clamping bolt 10 against the flank of the base body 1 that forms the contact surface 4, thus subjecting the clamping bolt 10 to stress only upon tension and the material of the base body 1 only upon compression. Therefore, there is no risk of expanding the fixture 3 due to the clamping force. In addition, the semi-circular groove 7 prevents the occurrence of nicks at the transition of the flanks of the fixture 3 to its base.

For radial positioning of the blade 6 and its positive engaging connection relative to the centrifugal force with the clamping element 8, the blade 5 is provided near the blade's edge on the side facing the clamping element 8, with a groove 11, which extends parallel to the central bore 2 over the entire axial reach and into which a corresponding designed rib 12 of the clamping element 8 reaches that also extends over the entire axial reach.

A cylindrical pin 13 protruding perpendicularly from the contact surface 4 serves to axially position the blade 5 by engaging into a retaining groove 14 on the inner edge of the balde 5.

In that region that receives the section of the clamping element 8 between the rib 12 and the semicylindrical material segments 8', the width of the fixture 3 is only negligibly greater than the sum of the thickness of the blade 5 and the clamping element 8. Outside this region the width of the fixture 3 is enlarged multiple times, forming a rounded step, since this part of the fixture 3 serves as the groove.

The two outer dashed circular lines 15 and 16 are supposed to illustrate only that cutting arcs of different sizes can be realized.

Since, when tightening the clamping bolt 10, the clamping element 8 effects a negligible swivel motion, the clamping force can be conveyed to the blade 5 over the entire contact surface 4 as far as its radial outer edge, resulting in the blade 5 being excellently clamped. Since the clamping element 8 is profiled according to the blade 5 and is provided with a discharge slope 8", it acts as a chip breaker.

Figure 2:
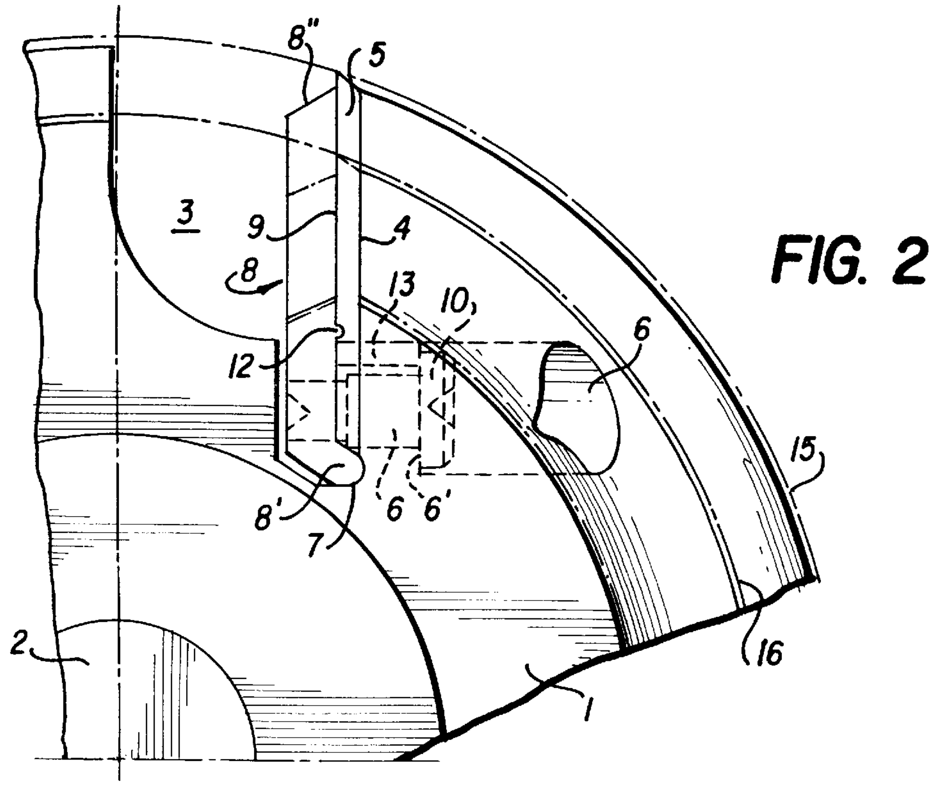
FIG. 2 is an enlarged cutout of a top view of the one face of the embodiment.

Even the base body 1 is profiled according to the blade 5, whereby, as FIG. 2 shows, the blade 5 projects only negligibly, for example 1 mm, beyond the outer jacket of the base body 1. Thus the requisite recoil safety is guaranteed, while the optimal shape of the chip space and the design of the clamping element 8 as chip breaker guarantees a trouble-free discharge of the chips and thus a reduction in the amount of dust generated.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed:

1. Cutter head having an axis of rotation and comprising:

a base having a circumference and at least two fixtures in the circumference of said base, a groove and a contact surface formed in the base at each fixture;

a clamping device including a clamping element mounted in each of said fixtures for interchangeably and fixedly receiving a cutting blade, said clamping element including an inner pivot portion, said cutting blade having a flat surface confronting said clamping element;

the inner pivot portion of said clamping element being pivotably positioned in said groove so as to form a pivot axis of the clamping element parallel to the axis of rotation of said cutter head, said clamping element being pivotable about said pivot axis; and a clamping bolt for clamping said clamping element with respect to said fixture;

each clamping element having a flat bearing surface forming a pressure zone for compressing said blade against the contact surface, said flat bearing surface of said clamping element being engagable with the flat surface of the blade over a planar area.

2. Cutter head as defined in claim 1, wherein said cutting blade has a cutting edge with a predetermined profile, said clamping element having a clamping edge with a profile substantially the same as the profile of said cutting edge.

3. Cutter head as defined in claim 1, wherein the inner pivot portion of said clamping element includes a semi-cylindrical segment which extends parallel to the axis of rotation of the base, said groove having a semi-cylindrical shape, said bearing element being received into said groove.

4. Cutter head as defined in claim 3, wherein said clamping bolt engages said clamping element between said inner pivot portion and said flat bearing surface.

5. Cutter head as defined in claim 4, wherein the base is provided with a bore to receive said clamping bolt, said clamping bolt having a head, said bore including a shoulder against which the head of the clamping bolt bears, said clamping element further including a tapped bore for threadably receiving said clamping bolt.

6. Cutter head as defined in claim 1, further including a locking connection between said clamping element and said cutting blade, said locking connection comprising a locking groove extending across said blade in a direction parallel to the axis of rotation of the base, said clamping element including a projecting segment which extends into the groove in said blade.

7. Cutter head as defined in claim 1, wherein said cutting blade includes a recess, a pin extending perpendicular to the axis of the base and projecting from the contact surface of the base, said pin engaging in the recess of the blade to lock the blade against movement in the direction of the axis of the base.

8. Cutter head as defined in claim 2, wherein the fixture of the base has an edge defining a side of the contact surface, said edge having a profile corresponding to the profile of the cutting edge of said blade.

9. Cutter head as defined in claim 1, wherein said base includes at least two fixtures diametrically opposed for receiving at least two clamping devices, including at least two clamping elements and at least two cutting blades.

10. Cutter head as defined in claim 1, wherein the flat surface of said cutting blade has a predetermined perimetrical shape including at least one non-linear portion, the flat bearing surface of said clamping element having a perimetrical shape substantially the same as the perimetrical shape of the flat surface of the cutting blade.

11. A cutter head having an axis of rotation comprising:

a base having at least one fixture for receiving a cutting blade;

a cutting blade disposed in said fixture, said cutting blade having a flat blade surface and a cutting edge with a predetermined non-linear profile; and a clamping device including a pivotable clamping element removably fixed in said fixture for securing said cutting blade in said fixture, said clamping element having a flat bearing surface and a clamping edge with a profile substantially the same as the predetermined profile of said cutting edge, the flat bearing surface of said clamping element being engagable with the flat blade surface of the cutting blade over a planar area therebetween.

12. The cutter head of claim 11, wherein said fixture has a contact surface for said cutting blade, said contact surface having a side defining a fixture edge, said fixture edge having a profile substantially the same as the predetermined profile of said cutting edge.

13. The cutter head of claim 11, wherein said predetermined non-linear profile is arcuate.

14. The cutter head of claim 11, wherein said clamping element has an inner pivot portion and said fixture has a groove formed therein parallel to the axis of rotation of the cutter head, said inner pivot portion being pivotably engaged in said groove.

15. The cutter head of claim 11, wherein the flat blade surface of the cutting blade has a predetermined perimetrical shape including at least one non-linear portion, the flat bearing surface of said clamping element having a predetermined perimetrical shape substantially the same as the perimetrical shape of the flat blade surface.

16. The cutter head of claim 15, wherein said fixture has a contact edge against which the cutting blade bears, said contact edge having a profile substantially the same as the predetermined profile of said cutting edge.

* * * * *